United States Patent [19]

Peck et al.

[11] 3,765,185

[45] Oct. 16, 1973

[54] PIPELINE POSITIONING SYSTEM AND METHOD

[75] Inventors: Ira J. Peck, Dresher; Standish H. Smith, Penn Valley, both of Pa.

[73] Assignee: Aqua Systems, Inc., Gladwyne, Pa.

[22] Filed: Dec. 22, 1971

[21] Appl. No.: 211,016

[52] U.S. Cl. .................... 61/72.3, 114/16, 114/16.8
[51] Int. Cl. .......................... F16l 1/00, B63b 35/04
[58] Field of Search .................. 61/72.3, 72.1, 72.4; 114/16, 16.8

[56] References Cited
UNITED STATES PATENTS

| 3,620,028 | 11/1971 | Wilde | 61/72.3 |
| 3,359,741 | 12/1967 | Nelson | 61/72.3 X |
| 3,262,275 | 7/1966 | Perret | 61/72.3 |
| 3,668,878 | 6/1972 | Jones et al. | 61/72.3 |
| 3,702,597 | 11/1972 | Odom et al. | 114/16.8 |

FOREIGN PATENTS OR APPLICATIONS

| 1,246,266 | 10/1960 | France | 61/72.3 |

Primary Examiner—Jacob Shapiro
Attorney—Paul Maleson

[57] ABSTRACT

A pipeline positioning system and method of accomplishing same for continuously laying pipeline beneath the surface of a liquid. The system includes a plurality of submersible vehicles which are moveably attached to the pipeline. The submersible vehicles may apply translative and rotative forces to the pipeline in order to achieve a predetermined contour of the pipeline beneath the surface of the liquid. A plurality of vehicle guidance mechanisms moveably fastened to all submersible vehicles in order to determine the spatial orientation of the pipeline and a remotely located controlling mechanism drives the submersible vehicles in a manner such that the pipeline is moved to the predetermined contour. The submersible vehicles may be translated along the pipeline to afford continuous laying of the pipeline beneath the liquid surface at any depth and under adverse weather and current conditions.

33 Claims, 12 Drawing Figures

FIG. 2
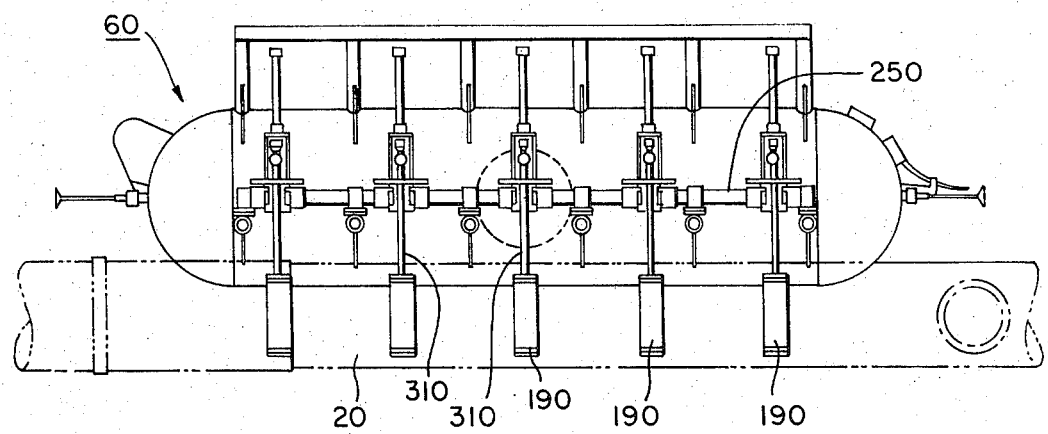
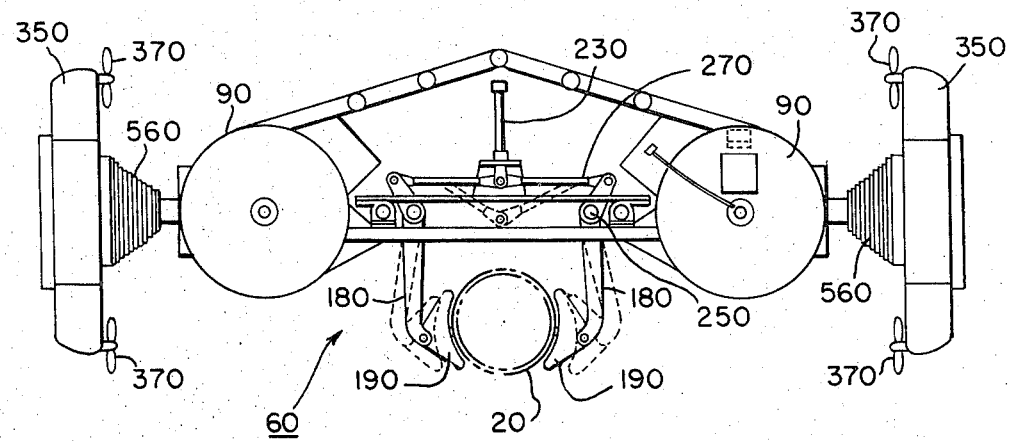
FIG. 3

PIPELINE POSITIONING SYSTEM AND METHOD

BACKGROUND OF THE INVENTION

1. Field of the Invention

This invention pertains to the field of controlling the contour of an elongated member beneath the surface of a liquid. In particular, this invention relates to the field of controlling the spatial orientation of a pipeline when the pipeline is passed beneath the surface of a liquid. More in particular, this invention relates to the field of moving a pipeline beneath the surface of a liquid to a predetermined contour through actuation of a plurality of submersible vehicles moveably fastened to the pipeline.

2. Prior Art

Prior systems and methods of contouring pipelines beneath the surface of a liquid are known. Some prior methods solely add a concrete coating to the pipeline before insertion into the water in order to add weight and thereby aid in lowering the pipeline to a bottom surface beneath the water. However such systems and methods commonly fail due to an insufficient radius of curvature of the pipeline and it has been found that in such instances the concrete coating may crack and further, structural failure of the pipeline may follow.

Other prior systems limit the bending stresses of submerged pipelines by supporting the pipeline through a series of pontoons and rollers. This supporting system is commonly referred to as a stinger. The rollers ease the transition of the pipeline from a lay vessel to the bottom surface. These stingers are usually made as long as possible in order to support the pipeline as close to the bottom surface as is possible. However, such mechanisms frequently fracture or break loose from the lay vessel under adverse weather conditions, strong currents, and/or excessive lay vessel motion. Additionally, when such systems are in use, the pipeline often disengages itself from the stinger in rough weather and is then susceptible to buckling failure.

Prior systems include the use of tensioning equipment either individually or in conjunction with stingers, in order to increase the unsupported length of the pipeline. This equipment is frequently mounted on the lay vessel and serves to reduce pipeline curvature by applying axial tension. However, the use of such tensioning equipment often causes pipeline fracture due to lay barge anchor dragging, tensile failure of a concrete coating if one has been applied, and possible fraying of the cables in the tensioning mechanism.

Use of such prior art methods and systems is limited by transverse water currents. The drag forces resulting from high current levels may result in pipe buckling, stinger fracture, and/or extreme difficulty in laying the pipeline along a substantially straight line in a predetermined location. Additionally, by using such prior systems there is no provision made for measuring and controlling the pipeline curvature during the pipelaying operation. This restraint makes it difficult to anticipate a possible failure and therefore often does not allow corrective action to be taken prior to the failure.

SUMMARY OF THE INVENTION

A system for controlling the spatial orientation of a pipeline for predetermining the contour of the pipeline when the pipeline is passed beneath the surface of a liquid. The pipeline is extended in a direction defining a longitudinal axis of the pipeline. The system includes a submersible vehicle which is releasably secured to the pipeline for spatially orienting the pipeline in the predetermined contour. A vehicle guidance mechanism is fastened to the submersible vehicle for determining the spatial orientation of the pipeline beneath the liquid. Control mechanisms control the submersible vehicle responsive to a signal from the vehicle guidance mechanism.

An object of the present invention is to provide a pipelaying system that controls the stress in the pipeline during the laying operation by supporting the pipeline in a controllable manner at any liquid depth.

Another object of the instant invention is to allow elimination of auxiliary tensioning equipment that supports the pipeline by means of a vertical component of the tensioning force.

A further object of this invention is to eliminate the need for the conventional pipeline supporting equipment used in the pipelaying operation.

A still further object of the invention as herein described is to provide a pipelaying system incorporating a plurality of submersible vehicles attached to the pipeline which counteract the effects of currents in any direction.

BRIEF DESCRIPTION OF THE DRAWINGS

FIG. 2 is an elevational view of a submersible vehicle attached to a pipeline;

FIG. 3 is an end view of a submersible vehicle showing both a buoyancy subsystem and a thruster subsystem;

DESCRIPTION OF THE PREFERRED EMBODIMENT

Figure 1:
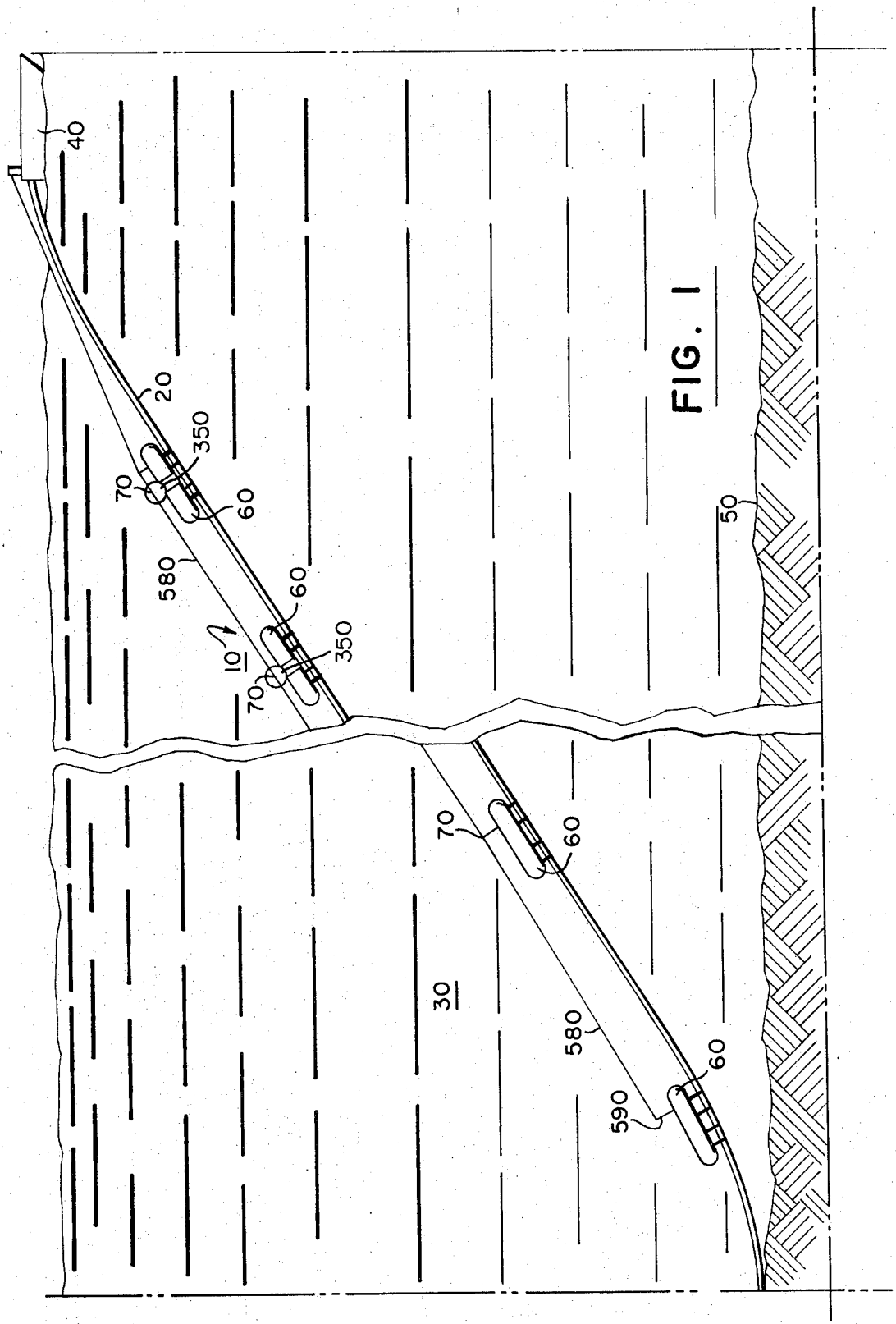
FIG. 1 is a partially fragmented elevational view of the pipeline positioning system showing a plurality of submersible vehicles attached to the pipeline.
Figure 8:
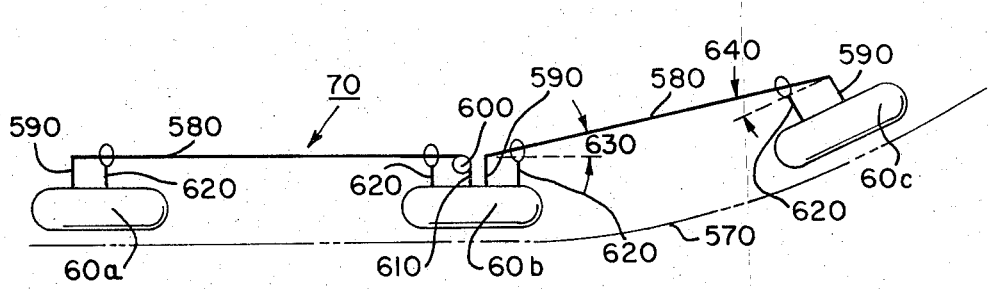
FIG. 8 is a schematic drawing showing the operation of the vehicle guidance mechanism.

Referring now to FIG. 1, there is shown pipeline or elongated member spatial orientation system 10 for controlling the contour of pipeline 20 when it is passed beneath the surface of liquid 30. In the following description, it is to be understood that elongated member 20 may include pipelines, cables or other like elongated materials which may be passed beneath the surface of liquid 30. As is shown in the figure, pipeline 20 is passed from vehicle 40 downward throughout the depth of liquid 30 to eventually rest on liquid surface interface 50. System 10 provides a series of mechanisms through which vertical, horizontal, and rotational forces may be applied to pipeline 20 being laid in liquid 30 to control its curvature such that allowable bending stresses are not exceeded. In the manner to be described, system 10 controls the spatial orientation of pipeline 20 to a predetermined contour to allow extensive lengths of elongated member 20 to be placed on interface surface 50 without structural malfunction of the material components of line 20. System 10 comprises a plurality of submersible vehicles 60 which are releasably secured to line 20 and create forces on the pipeline for spatially orienting member 20 in a predetermined contour with respect to surrounding liquid 30 and interface 50. In addition, vehicle guidance mechanism 70 is fastened to submersible vehicles 60 as shown in FIG. 1 and FIG. 8 for determining the spatial orientation of line 20. Guidance mechanism 70, as will be herein described, passes a signal to a controlling mechanism located remote to submersible vehicles 60 and generally positioned on vehicle or lay vessel 40. The controlling mechanism interprets the signal defining the spatial orientation of line or elongated member 20 and then in turn passes electrical signals to vehicles 60 for realignment of pipeline 20 within liquid 30.

Figure 4:
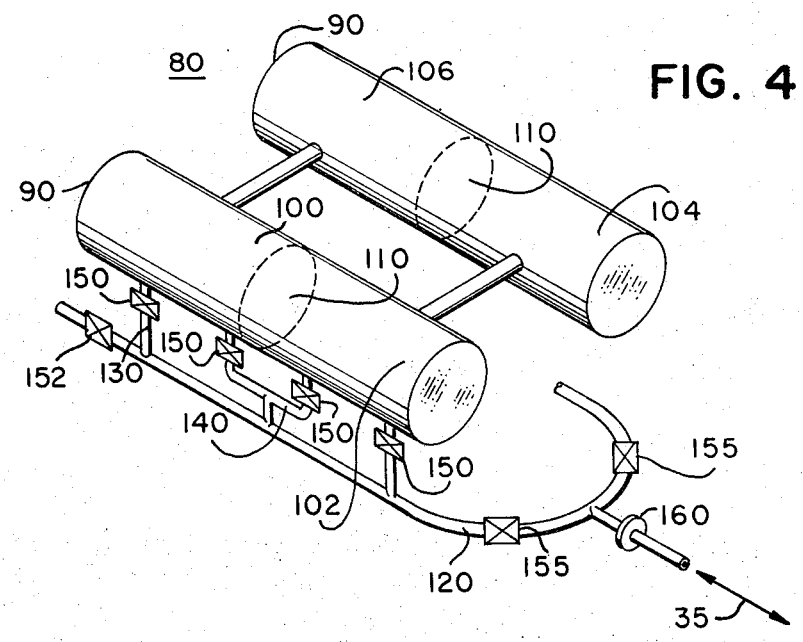
FIG. 4 is a partially fragmented perspective view of the buoyancy subsystem of the submersible vehicle.

Submersible vehicles 60 clearly shown in FIGS. 4 and 3 include buoyancy mechanism 80 for buoying pipeline 20 within liquid 30. Mechanism 80 is detailed in FIGS. 2, 3 and 4. Buoyancy subsystem or mechanism 80 provides means for positive and/or negative buoyancy, forward and/or aft pitch along pipeline 20 and a clockwise/counter clockwise rotation about line 20 responsive to commands from a control mechanism. As is seen, in FIG. 4, buoyancy mechanism 80 includes a pair of tanks or manifolds 90 which are positioned on opposing transverse sides of elongated member 20. Tanks 90 extend in a direction substantially parallel with but laterally displaced from the axis of line 20. As will herein be used, the axis of member 20 defines a longitudinal direction corresponding to the local direction of the axis of pipeline or cable 20. Therefore, in FIG. 4 the longitudinal direction is defined as the direction shown for directional arrow 35. Tanks 90 are divided into sealed compartments 100, 102, 104, and 106 which are separated by walls 110 in order that liquid 30 may not pass therebetween. Construction of tanks 90 may be of stainless steel or other such material which can take the structural loading of liquid 30 as well as not being corrodable with respect to the surrounding environment. Liquid 30 may be passed into or out of sealed compartments 100, 102, 104 and 106 through lines 120, which as is shown, is opened to the surrounding liquid 30 on opposing ends thereof. Operation of system 10 is not limited to four compartments as shown, but may include more or less compartments attendant on optimized design criteria. Liquid 30 may pass into lines 120 from the surrounding environment and pass through intake line 130 to fill respective compartments 100 and 106. Passage of liquid 30 from the plurality of compartments 100, 102, 104 and 106 includes the flow of liquid 30 through outlet lines 140 into lines 120 and then to the surrounding environment. A plurality of unidirectional valves 150 are integrally connected with lines 120, 130, and 140 to insure a flow of liquid 30 in only one direction. Such unidirectional mechanism 150 may consist of check valves or other like flow controlling mechanisms which are well known in the art. Pump mechanism 160 may pressurize ballast liquid sufficiently to discharge such to the surrounding environment 30.

In the manner described, submersible vehicle 60 may be pitched in a forward down direction by opening valves 150 and flow valves 152 associated with opposing forward sealed compartments 102 and 104. This has the effect of rotating vehicle 60 in a direction having a component in the direction of directional arrow 35 with respect to an axis normal to the longitudinal axis of pipeline 20. Similarly, vehicle 60 may be rotated in an opposing direction by filling rearward tanks or sealed compartments 100 and 106, thus causing a rearwardly directed rotation of vehicle 60. To provide a negative buoyancy for the entire vehicle 60 all compartments 100, 102, 104 and 106 may be filled with liquid 30 and in similar manner a positive buoyancy may be obtained by emptying all of the compartments simultaneously. Additionally, vehicle rotation about pipeline 20 may be accomplished by filling or exhausting a pair of compartments 104, 106 or 100, 102 in order to achieve a differential buoyancy with respect to each of said paired compartments.

In summary, operation of buoyancy mechanism 80 is maintained by a predetermined filling and exhausting of liquid 30 from and to chambers or compartments 100, 102, 104 and 106. In order to pitch submersible vehicle 60 in a forward down direction, check valves 150 associated with intake lines 130 of compartments 102 and 104 are opened. High pressure liquid 30 enters until a desired ballast is attained, at which time valves 150 are closed. When the forward down pitch is to be cancelled, compartments 102 and 104 may be emptied by opening manifold valves 155 and evacuating the respective chambers by means of pump 160 and allowing ballast liquid to flow by gravity assist through respective valves 150. As may well be understood, aft pitch rotations are accomplished in a similar manner to that which has been described with the difference being that chambers 100 and 106 are filled and exhausted.

Figure 5:
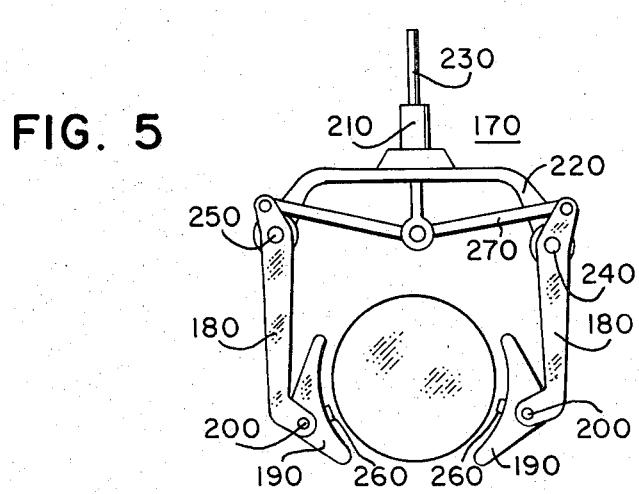
FIG. 5 is an end view of a pipe clamping mechanism for securement between the pipeline and the submersible vehicle.

Vehicles 60 are positionally aligned with respect to pipeline 20 through securement mechanism 170 shown in FIG. 5. Clamping or holding mechanism 180 engages opposing boundary surfaces of line 20 to relatively fix vehicles 60 with respect to member 20 within liquid 30 at any predetermined time. A plurality of clamps or padded feet 190 clearly shown in FIGS. 5 and 7 make contact with line 20. Clamps 190 include a pad contour substantially equal to the engaging surfaces between pipeline 20 and feet 190, as is shown. Ease of clamping is maintained through clamps 190 pivotally connected around clamp pivot point 200 as is seen in FIG. 5. Actuation occurs through double-acting hydraulic cylinder 210 which is connected to transversely positioned and moveable platform 220. Hydraulic rod 230 may be forced in a vertically upward or downward direction by hydraulic cylinder 210 which actuates linkage systems 270 and 180 as is shown. Downward displacement of hydraulic rod 230 causes clamps 190 to be displaced with respect to the peripheral walls of pipeline 20. An upward directed force on rod 230 causes engagement between padded feet 190 and pipe line 20. Journal bearings 240 slide longitudinally on shafts 250 and are fixed to transverse platform 220 to provide the necessary vehicle 60 tie points. Force sensing transducers 260 are provided on clamps 190 in order to stop cylinder piston stroke at preselected load levels in order than no damage may occur to line 20, its coatings, or any component parts.

The hydraulic cylinder piston stroke may be adjusted in order that clamps 190 may be sufficiently displaced so as to clear any side mounted protruding members on the surface of pipe line 20. Displacement sensors or some like mechanisms may be provided on each vehicle 60 to detect such protruding members and therein transmit appropriate signals to a controlling mechanism located on external vehicle 40. In the event of a hydraulic pressure failure, a feature is provided in the design of clamping or holding mechanism 180 to insure that each submersible vehicle 60 will maintain its support of member 20. This feature insures that the clamp or padded feet 190 remain securely attached to pipeline 20 should the hydraulic pressure fail. This feature is accomplished by designing clamping mechanism 180 such that linkage 270 lies along a transverse straight line when clamps 190 are secured to pipeline 20. In this manner the only way which clamp 190 can be opened is to apply sufficient hydraulic pressure to the top of the piston to move the piston in a downward direction. The weight of pipeline 20 cannot open clamps 190 since this weight merely results in inconsequential compressive loads in linkage 270.

Figure 6:
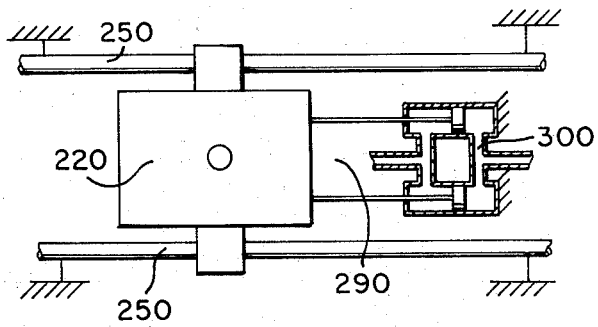
FIG. 6 is a plan view partially in schematic, of a translating mechanism to permit movement of the submersible vehicle along the pipeline.
Figure 7:
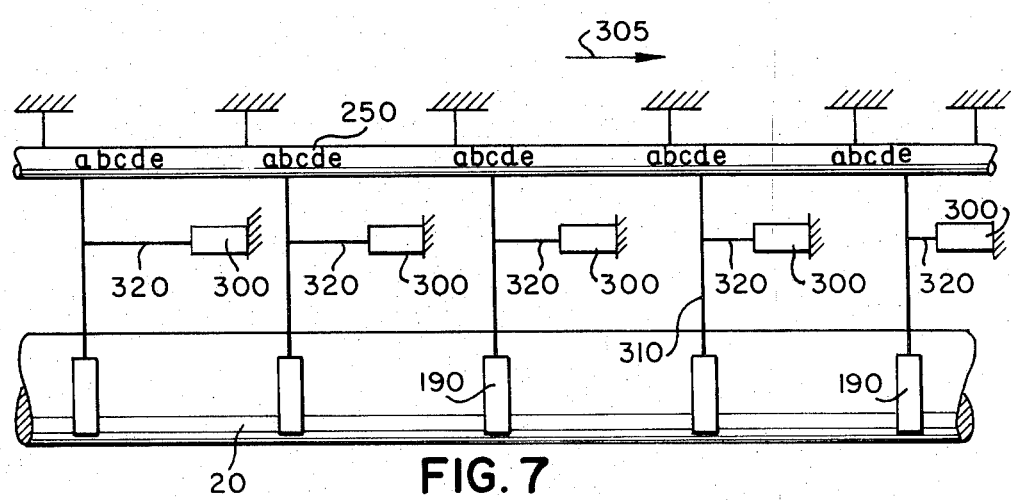
FIG. 7 is an elevational view partially in schematic, of the translating mechanism for detailing the translating operation.

Submersible vehicles 60 also include translating mechanisms 290 shown schematically in FIGS. 6 and 7 for the purpose of permitting vehicles 60 to move longitudinally with respect to pipeline 20 throughout the contour within liquid 30. In the manner to be shown, vehicles 60 permit motion along member 20 in a direction substantially coincident with the longitudinal axis thereof. As is seen, each of clamping or holding mechanisms 180 includes a hydraulic pressure supply 300 which in itself is secured to vehicle 60. In the schematic representation, attachment to vehicles 60 is shown as a grounded attachment. Clamp support 310 attached on opposing ends to shaft 250 and clamp 190 provides the necessary securement of clamping mechanism 180 to line 20. When clamp 190 is in a force fit condition with respect to pipeline 20, the piston within cylinder or hydraulic pressure unit 300 is stationary. Translation is accomplished by moving cylinders 300, shafts 250, and vehicle 60 in a forward direction 305 with respect to pipeline 20.

As is seen in FIG. 7, shaft 250 and system 80 is translated to a respective reference position numeral shown on shaft 250 (a, b, c, d, or e) in continuous, sequential order. In operation, shaft 250 and cylinder 300 which is itself attached to shaft 250 moves to a next lower numbered letter, exposing more of pressure rod 320. During the period of motion from numeral e to numeral a, feet 190 remain securely attached to line 20. When clamp 190 is positioned at numeral a, a quick release mechanism releases clamp 190 from line 20 and repositions feet 190 at position numeral e in a fixedly attached manner as is shown.

As is seen, operation of each of mechanisms 180 is accomplished sequentially, such that only one of clamps 190 is detached from line 20 at any particular time interval. Additionally, although not a part of the inventive concept, such repositioning may also include purely mechanical movement means, as opposed to the hydraulic actuation as has herein been described.

Figure 9:
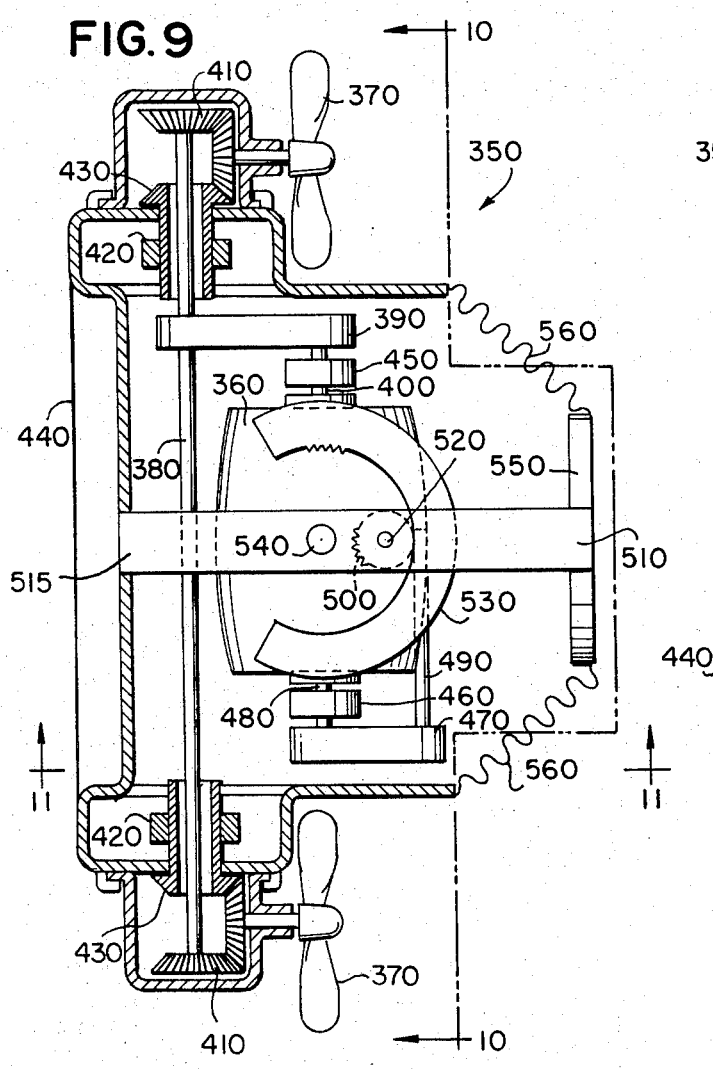
FIG. 9 is a cross-sectional view of the thruster subsystem.
Figure 10:
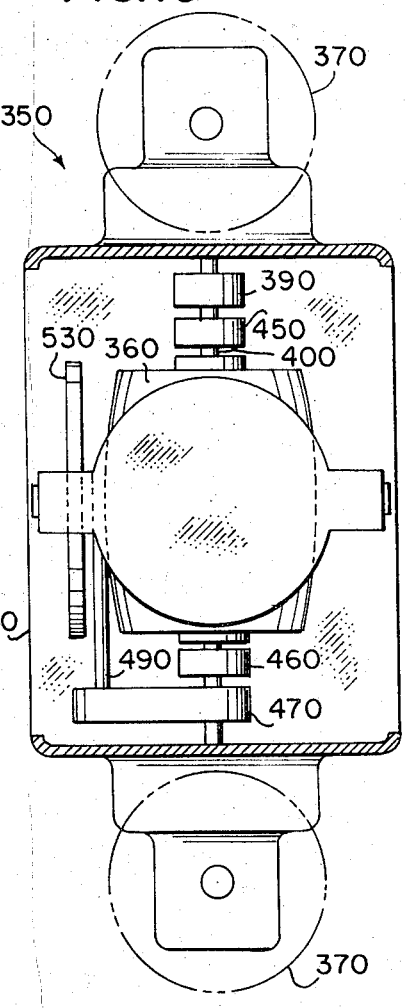
FIG. 10 is a cross-sectional view of the thruster subsystem taken along the section line 10—10 of FIG. 9.
Figure 11:
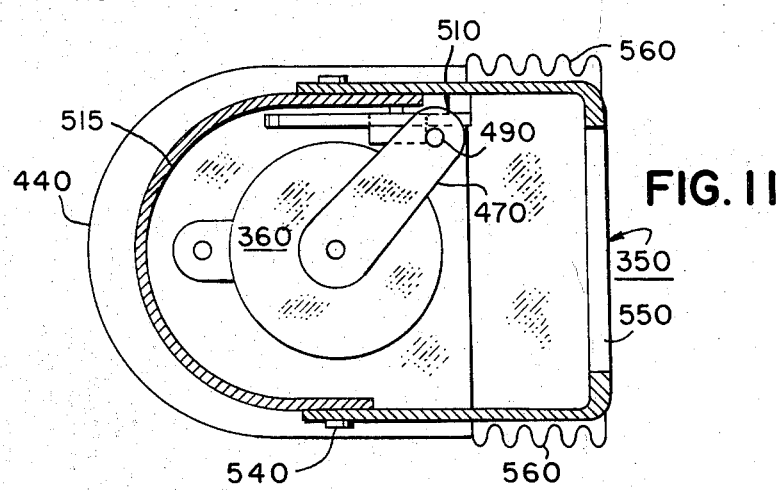
FIG. 11 is a cross-sectional view of the thruster subsystem taken along the section line 11—11 of FIG. 9.

Referring now to FIGS. 9, 10 and 11 there is shown thruster subsystem or mechanism 350 secured to submersible vehicle 60 as shown in FIG. 3. Subsystem 350 is provided in order to counteract any deleterious effects of the liquid currents that exist between the surface of the liquid and a depth at which such currents are negligible, as well as providing counteracting thrusts to pipeline or substantially flexible member 20 when an unexpected force is applied thereto. As will be described, system 350 has the capacity of generating variable thrust levels which can compensate for a large range of current velocities in a multiplicity of directions. Subsystem 350 provides means for thrusting pipeline 20 in a plane containing the longitudinal axis thereof thereby exerting a force on pipeline 20 which is normally directed with respect to the pipeline longitudinal axis. As is shown in FIG. 3, a pair of thruster subsystems 350 may be secured to vehicle 60 transversely displaced from the longitudinal axis of pipeline 20.

Thruster mechanism 350 includes motor or drive mechanism 360 to actuate propeller or force mechanisms 370. As is seen, a pair of propeller systems 370 are positioned in a vertically displaced operating mode. In general operation, actuation of drive mechanisms 360 causes rotation of longitudinally directed shaft member 380. Rotational speed of motor mechanism 360 is reduced through reduction gear box 390 which permits rotation of motor shaft 400 and longitudinal shaft 380 in a coplanar manner. Rotary motion of shaft 380 is transferred through pinion bevel gear mechanisms 410 to provide rotary motion to propellers 370 in a rotary plane substantially normal to the rotary motion plane of shaft 380. In this manner, propellers 370 may apply force loading to pipeline 20 in a direction normal to the direction of the pipeline longitudinal axis. Where two thruster assemblies 350 are utilized, as is depicted in FIG. 3, the same level and direction of thrust may be established by all four propellers 370 through synchronization of the component elements.

Propellers 370 may be rotated about an axis normal to the longitudinal axis of pipeline 20. In order to cause this rotation, clamp members 420 are energized in order to lock shaft mounted level gears 430. Therefore, level gears 430 are locked in position with respect to thruster housing 440 while still allowing rotation of longitudinal shaft member 380. Actuation of motor 360 and magnetic clutch 450 causes rotation of shaft 380 which is transferred to pinion/level gear mechanism 410 and propellers 370. However, since level gears 430 are not moveable with respect to housing 440 and contact gear mechanism 410 as is shown, there is then seen a rotary translation of propellers 370 about the longitudinal axis of shaft 380. By causing pinion/level gear mechanism 410 to walk or be translated around shaft mounted level gears 430, the thrust load direction may be preset to a predetermined positional location. After reaching the predetermined location, propellers 370 may be driven in substantially the normal operating mode by removing energization or power from clamp members 420 followed by energization of magnetic clutch 450 and driving motor mechanism 360 at a predetermined desirable speed.

The direction of thrust may also be varied about an axis parallel to the longitudinal axis of pipeline 20. Where the direction of thruster subsystem 350 is to be varied in this manner, lower magnetic clutch 460 is energized to allow drive mechanism or motor 360 to actuate lower gear reduction mechanism 470 through rotary actuation of rotating shaft 480. Mechanism 470 then drives worm gear 490 which contacts pinion gear 500 and rotarily drives same. Pinion gear 500 is pivotally mounted on horizontal bar member 515 at pivot point 520. Further, gear 500 mates with inner sector gear 530 mounted to bar member 510. Rotary motion of pinion gear 500 then may cause a pivoting of the entire thruster about trunnions 540 as is shown in FIG. 9. Therefore, as is seen, pinion gear 500 "walks" around gear 530 upon actuation.

In normal use, thruster subsystem 350 may be attached to submersible vehicles 60 through use of bolt flanges 550 or some like means not important to the inventive concept as herein defined. Additionally, diaphragm 560 may enclose subsystem 350 which may be oil filled. This type enclosure provides protection for the internally working component parts of sybsystem 350 while further providing pressure equalization between the external and internal thruster environment.

An individual control, instrumentation, and power cable may be connected to each submersible vehicle 60 and attached to a control console located on lay vehicle 40 on an opposing end thereof. Such individual cabling may have the effect of increasing the reliability of thruster subsystem 350 through redundancy. In the manner well known in the art, control signals may be sent from the control console through the previously mentioned cables, in order to control the direction and level of thrust. In like manner, signals from a tachometer and a pair of normally oriented position potentiometers, attached to vehicles 60, are sent through the control cables to the control console to indicate the level and direction of the thrust provided.

An embodiment of thruster subsystem 350 may employ AC squirrel-cage induction motors instead of DC motors at the drive mechanism 360. Use of such AC motors may have advantages in the areas of maintainability and reliability. Speeds of this type motor may be varied as a function of the frequency of the applied power. Further, a lay vessel mounted DC generator would supply power to drive mechanism 360 through a control console and the aforementioned cabling. The control console would contain a variable oscillator for the pair of motors associated with each submersible vehicle 60. Each variable oscillator would then invert the generated power from DC to AC and would vary the frequency of the AC power supplied to the associated pairs of motors. This procedure would then vary the output speed of the motor system.

Where electrically reversible, adjustable speed, DC motors power propellers 370 in each thruster subsystem 350, electrical power is provided for all drive mechanisms 360 by a single AC generator that is mounted on lay vessel 40. The size of transmission lines between vessel 40 and thrusters subsystem 350 may be minimized by transmitting the AC power at high voltage. Additionally each submersible vehicle 60 may have attached thereto, a stepdown transformer, on SCR AC–DC converter and a remotely activated starter/controller. The stepdown transformer reduces the supplied voltage to the amount required by driving mechanism 360. Since DC motors may be used, the converter transforms the reduced voltage AC power to the DC power required by the motors. The starter/controller is used to start the thruster motors and control their speed. It may be noted that the use of a single starter/controller on each of vehicles 60 insures that both thruster subsystems 350 are operating at the same speed at any given time.

As has been described, the direction of thrust provided by thruster subsystems 350 is controllable in two planes. The combination of directional controllability and reversibility of motor mechanisms 360 facilitates the application of thrust to counteract currents substantially in any direction.

The mechanism for determining a first pipeline 20 contour to aid in alignment procedures is shown in FIG. 8 as associated with the overall view of system 10 shown in FIG. 1. In FIG. 8 three submersible vehicles 60a, 60b and 60c are shown and are normally attached to elongated member 20 represented in this figure by pipeline centerline 570. The vehicle guidance mechanism 70 as depicted in this figure includes taut wire 580 passing between consecutively spaced submersible vehicles 60a, 60b and 60b, 60c. Wire 580 is preferably constructed of a material such as flexible steel or some like material having sufficient structural stability to accept the loads involved and further being corrosion-resistant within liquid 30. As shown, wire 580 is stretched between vehicles 60a, 60b and is secured to protruding member 590 on vehicle 60a. Member 590 is secured on one end to vehicle 60a and on an opposing end to wire 580. In general, member 590 preferably extends vertical to vehicle 60a and is rigidly fastened thereto. Construction of member 590 includes use of a bar or rod member which will remain positionally stable with respect to an associated vehicle 60 during the operation of spatial orientation system 10. Wire 580 passes over pulley 600 on vehicle 60b in rolling contact relation thereto, where pulley 600 is maintained in relative positional stability with respect to vehicle 60b by pulley bar member 610. Wire 580 enters a take up device on vehicle 60b wich may be of the spring loaded type well known in the art. The take up device (not shown) maintains a predetermined tension in wire 580, increasing the length between vehicles 60a, 60b or decreasing the length as is required. A standard revolution counter or other sending/measuring mechanism sends an electrical signal corresponding to the length of wire 580 between vehicles 60a, 60b in order that the spacing of vehicles may be controlled.

As shown in FIG. 8, wire 580 in passing between two consecutively spaced vehicles goes through a pair of force or positional displacement sensors 620, well known in the art. Sensors 620 are longitudinally placed at a fixed distance from protruding member 590 and pulley bar member 610 in order to aid in the displacement calculations.

In operation, when pipeline 20 is horizontally and vertically straight as between vehicles 60a and 60b, then these consecutive vehicles are in line and wire 580 does not displace sensors 620 and the sensor output is zero. When member 20, and therefore centerline 570, is misaligned as between vehicles 60b and 60c, then wire 580 makes an angle 630 with respect to vehicle 60b and an angle 640 with respect to vehicle 60c. Thus, associated sensors 620 are disturbed which results in a measurement and a signal being sent as to the respective angles 630, 640.

Vehicles 60b and 60c may then be aligned by driving vehicle 60c in a direction so as to reduce the difference between the respective angles 630 and 640 wherein the sensor signal will also be reduced in magnitude. Alternatively, operator control may set pipeline 20 to any predetermined straight or curved line by moving submersible vehicles 60 initially to a predetermined longitudinal spacing and then to predetermined angles 630 and 640 or even predetermined displacements from a known reference point.

In the manner shown, vehicle guidance mechanism 70 may be used to determine spatial orientation of line member 20 in both a vertical and horizontal plane. The addition of a second taut string mechanism may be used in conjunction with the system 70 as herein described for purposes of verification and/or increasing positional displacement signal strength.

An embodiment of the invention includes dispensing with the taut wire or cable 580 system and establishing position of vehicle 60 through a sonar system. In this case guidance mechanism 70 may locate vehicles 60 through triangulation. Mechanism 70 may be located remote to vehicles 60 on board a plurality of lay vessels 40. In this embodiment, the hardware complexity of system 10 may be decreased, but such may increase the overall complexity of system 10 with the addition of the remotely located sonar finding system.

Figure 12:
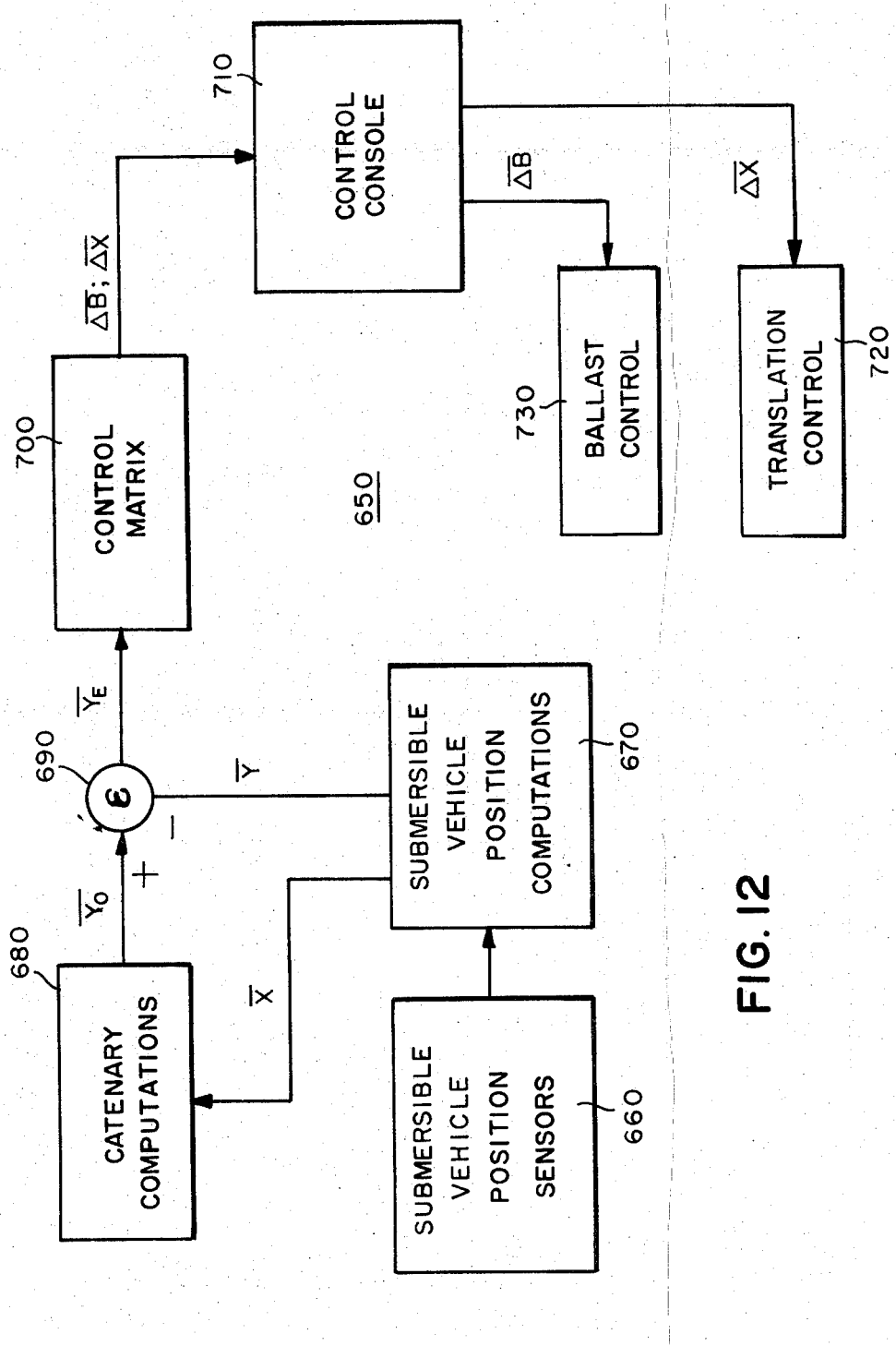
FIG. 12 is a block diagram of the control subsystem.

Control mechanism 650 for controlling submersible vehicles 60 and correspondingly line 20 responsive to a signal from vehicle guidance mechanism 70 is shown in block diagram form in FIG. 12. As shown in the figure, the control is for a two dimensional problem solution. As is understood by those versed in the art, the existance of crosscurrents adds a third dimension to the problem, however, such only serves to increase the computational load but does not affect the basic control concept.

Submersible vehicle position sensors take positional readings in flow block 660. These readings are processed within submersible vehicle position computations block 670 which obtains the range and depth of individual submersible vehicles 60. The positional locations of vehicles 60 are shown leaving block 670 in vector notation to simplify the mathematical rotation. Submersible vehicle range X (vector quantity), is sent to computation flow block 680 where the catenary computations are solved to evaluate a desired depth of vehicle 60. The desired depth $Y_o$ (vector) calculated in block 680 enters block 690 as does the actual depth Y (vector) from 670. The value of the depth error is calculated in flow block 690 where the difference between $Y_o$ and Y are taken to achieve the depth error $Y_e$ (vector) which is fed into control matrix block 700.

The depth errors $Y_E$ are operated upon by the control matrix 700 to generate the necessary changes in ballast (Delta B) and vehicle 60 positioning along pipeline 20 (Delta X). These results are the control commands which are verified and executed by buoyancy subsystem 80 and translating subsystem 290. Execution of these commands has the end result of repositioning pipeline 20 toward the catenary calculations evaluated in block 680. Commands leaving block 700 enter control console block 710 which transmits the commands to translation control block 720 and ballast control block 730. Upon receipt of the proper range command, block 720 activates mechanism 290 to position vehicle 60 in proper location along line 20. Ballast control block 730 is a feedback control system. Therefore, the input command received from control console 710 is the desired ballast differential. The difference between the desired and the measured valves energizes ballast pump 160 and/or valves 150, 155. When the value of the ballast differential error is sufficiently small, the ballasting mechanisms may be de-energized.

Adding thruster subsystem to the control concept results in similar conceptual evaluations as was found in the ballast and translation control problem as herein described. The changes in contour of line 20 resulting from current drag are monitored by appropriate position sensors which are mounted on submersible vehicles 60. The outputs of these sensors are processed by position computations block 670 to obtain the relative lateral positions of submersible vehicles 60. Submersible vehicle lateral positions are sent to the lateral catenary computations analogous to block 680 of FIG. 12. Here the desired lateral position is computed for each vehicle 60. The error in the lateral position is the difference between the desired and the sensed lateral positions. Control matrix 700 operates on these errors to generate the desired changes in the level and direction of thrust for each thruster subsystem 350. Execution of these commands repositions pipeline 20 toward the desired lateral catenary.

Control subsystem 650 includes control console 710, a control computer and associated electronics, control communications links, control sensors, and various control actuators. These subsystems are interconnected such that the several phases of laying operations can be performed with safety and assurance. As has been described the control system block diagram of FIG. 12 shows the interconnections of the various subsystems within the control system 650.

Each vehicle 60 exerts positive and negative vertical forces on pipeline 20. Each thruster system 350 exerts a force on line 20 in the plane of local current drag. Control subsystem 650 establishes the set of forces that vehicles 60 should apply to line 20 in order to achieve a predetermined pipeline contour. Pipeline deployment must be such that the maximum allowable stress in the pipe will not be exceeded. Control subsystem 650 further monitors pipeline 20 to establish how closely the desired conditions are met. Vehicle forces and locations are modified until the desired pipe deployments stress levels are attained.

The control console as depicted by block 710 in FIG. 12 may for example consist of a discreet display rack, a plotting table, and a closed loop TV system. The discreet display rack has digital readouts and status lights. An operational vehicle 60 will have position, inclination, and status displayed sequentially. Computed stress levels, catenary shapes, and the point of maximum stress are available continuously. Control commands may be displayed for verification and execution on a computer display terminal similar to the Tektronix T4002 model or some like mechanism.

A plotting table is used to graphically display the position of lay vehicle 40, bottom surface 3, pipeline 20, and vehicles 60. Overlay may be utilized to facilitate rapid visual verification of pipe position. The closed loop TV system allows coordination of all phases of lay vessel 40 operations by providing all cognizant stations with instantaneous information on the status of operations. Digital display data and plottingg table graphs are displayed in the sequence most compatable with the operation being performed.

The control computer associated with control console 710 may be a small digital unit similar in nature to the Raytheon 704 which processes sensor data and the systems equations to establish the instantaneous status of pipeline system 10. The control equations are then processed to generate the control commands for vehicle positioning and buoyancy.

The desired pipe stress levels are dependent upon; (1) operations being performed i.e. start up, shut down, initial descent, and normal laying; (2) lay depth; and (3) pipe properties/characteristics. For a given pipeline 20 in a given environment, catenaries are synthesized which result in acceptable stress levels for the structural material of line 20. The catenaries can have a wide range of values which are highly dependent on pipeline supported length, supported weight, and curvature. For a particular portion of a laying operation, it may be desirable to have a nominal catenary different from that used in a similar situation. Nominal catenaries for the several portions of a major laying operation may be synthesized prior to the start of the laying operations.

The digital computer used to process data and generate commands to be executed by actuators utilizes a fundamental control mode of sampled data control. Sampled data control subsystem have three basic phases which are repeated sequentially while a particular subsystem is operating i.e., sampling, control computation, and command execution. In the sampling phase of an operation, the computer acquires data from the sensors. The data acquisition is implemented via a switching/multiplexing unit. The signals are quantized and digitized prior to being supplied to the computer. In the control computation phase sample data is processed to generate the commands to be executed to produce the desired pipe deployment. In the command execution phase the results of the control computations are implemented. The commands are transmitted to the vehicle control unit through the multiplexer subsystem. The vehicle control unit further accepts the set of commands designated for a specific vehicle 60. The commands are then executed by the several actuator subsystems as has been described.

The invention as herein described provides a system and method for controlling the spatial orientation of pipeline or elongated member 20 beneath the surface of liquid 30 having the advantage of permitting substantially continuous pipe laying at any depth under adverse weather and current conditions. The foregoing description is considered as illustrative only of the principles of the invention. Further, since numerous modifications and changes will readily occur to those skilled in the art, it is not desired to limit the invention to the exact construction and operation shown and described, and accordingy all suitable modifications and equivalents may be resorted to, falling within the scope of the invention as claimed.

What is claimed is:

1. A system for controlling the spatial orientation of a pipeline for predetermining the contour of said pipeline when said pipeline is passed beneath the surface of a liquid, said pipeline being extended in a direction defining a longitudinal axis of said pipeline, comprising:
 a. a submersible vehicle releasably secured to said pipeline for spatially orienting said pipeline in said predetermined contour; said submersible vehicle including
   1. means for releasably securing said submersible vehicle to said pipeline; and,
   2. means for translating said submersible vehicle along said pipeline in a direction substantially coincident with said longitudinal axis of said pipeline,
 b. vehicle guidance means fastened to said submersible vehicle for determining said spatial orientation of said pipeline beneath said liquid; and,
 c. means for controlling said submersible vehicle responsive to a signal from said vehicle guidance means.

2. The pipeline spatial orientation control system as recited in claim 1 wherein said means for releasably securing said vehicle includes:
 a. holding means on said submersible vehicle, said holding means for engaging opposing boundary surfaces of said pipeline; and,
 b. securement actuation means for providing transverse movement of said holding means for engagement of said pipeline.

3. The pipeline spatial orientation control system as recited in claim 2 wherein said holding means includes a pair of clamps for engagement on opposing surfaces of said pipeline, said clamps having a contour substantially equal to said engaging surface.

4. The pipeline spatial orientation control system as recited in claim 3 wherein said pair of clamps frictionally engage said pipeline peripheral surfaces when said securement actuation means provides a transverse movement of said clamps in a direction toward said longitudinal axis.

5. The pipeline spatial orientation control system as recited in claim 4 wherein each of said pair of clamps includes at least one force sensing transducer attached to a surface of said clamp interfacing with said pipeline, said transducers for measuring the force between said pipeline and said clamp.

6. The pipeline spatial orientation control system as recited in claim 2 wherein said securement actuation means includes a hydraulic cylinder piston for actuating said holding means, said piston having a substantially vertical movement for pivoting said holding means into engagement with said pipeline peripheral boundary.

7. The pipeline spatial orientation control system as recited in claim 1 wherein said translating means includes hydraulic positioning means mounted on said submersible vehicle for moving said submersible vehicle relative to said releasable securement means in a direction substantially coincident with said longitudinal axis.

8. The pipeline spatial orientation control system as recited in claim 7 wherein said hydraulic positioning means reversibly drives said releasable securement means with respect to said pipeline.

9. The pipeline spatial orientation control system as receited in claim 1 wherein said securing means includes a plurality of clamps moveably mounted on said system for frictionally engaging said pipeline.

10. A system for controlling the spatial orientation of a pipeline for predetermining the contour of said pipeline when said pipeline is passed beneath the surface of a liquid, said pipeline being extended in a direction defining a longitudinal axis of said pipeline, comprising:
 a. a submersible vehicle releasably secured to said pipeline for spatially orienting said pipeline in said predetermined contour; said submersible vehicle including
   1. means for thrusting said pipeline in a plane containing said longitudinal axis, said thrusting means for exerting a force on said pipeline normal said longitudinal axis, said means for thrusting said pipeline including at least one propeller mounted on said submersible vehicle, said propeller being transversely displaced from said pipeline; and, 2. means for buoying said pipeline within said liquid; and, 3. vehicle guidance means fastened to said submersible vehicle for determining said spatial orientation of said pipeline beneath said liquid.

11. A system for controlling the spatial orientation of a pipeline for predetermining the contour of said pipeline when said pipeline is passed beneath the surface of a liquid, said pipeline being extended in a direction defining a longitudinal axis of said pipeline, comprising:

a. a submersible vehicle releasably secured to said pipeline for spatially orienting said pipeline in said predetermined contour; said submersible vehicle including 1. means for thrusting said pipeline in a plane containing said longitudinal axis, said thrusting means for exerting a force on said pipeline normal said longitudinal axis, said means for thrusting said pipeline including a pair of propellers, said propellers being positioned coplanar with respect to each other, said propellers being transversely displaced from said pipeline; and, 2. means for buoying said pipeline within said liquid; and, 3. vehicle guidance means fastened to said submersible vehicle for determining said spatial orientation of said pipeline beneath said liquid.

12. A system for controlling the spatial orientation of a pipeline for predetermining the contour of said pipeline when said pipeline is passed beneath the surface of a liquid, said pipeline being extended in a direction defining a longitudinal axis of said pipeline, comprising:

a. a submersible vehicle releasably secured to said pipeline for spatially orienting said pipeline in said predetermined contour; said submersible vehicle including 1. means for thrusting said pipeline in a plane containing said longitudinal axis, said thrusting means for exerting a force on said pipeline normal said longitudinal axis, said means for thrusting said pipeline including a first and second pair of propellers mounted to said submersible vehicle, each of said pairs of propellers being transversely displaced from said pipeline; and, 2. means for buoying said pipeline within said liquid; and, 3. vehicle guidance means fastened to said submersible vehicle for determining said spatial orientation of said pipeline beneath said liquid.

13. The pipeline spatial orientation control system as recited in claim 12 wherein said propellers in said first and second pairs are substantially coplanar.

14. The pipeline spatial orientation control system as recited in claim 13 wherein said means for thrusting includes:

a. means for driving each of said pair of propellers about an axis substantially coincident with said longitudinal axis; and, b. means for rotating each of said pair of propellers about an axis substantially normal to said longitudinal axis of said pipeline.

15. The pipeline spatial orientation control system as recited in claim 14 wherein said means for thrusting includes positional thrust control means connected to said control means for indicating positional location of said thrust means.

16. The pipeline spatial orientation control system as recited in claim 15 wherein said positional thrust control means includes a pair of potentiometers, said potentiometers positioned normal with respect to each other for spatially orienting said thruster means.

17. The pipeline spatial orientation control system as recited in claim 14 wherein said means for thrusting includes force level control means mounted to said propellers for indicating the force exerted from said thrust means.

18. The pipeline spatial orientation control system as recited in claim 17 wherein said force level control means includes at least one tachometer for measuring the rotational speed of said propellers.

19. The pipeline spatial orientation control system as recited in claim 1 wherein said vehicle guidance means substantially follows said contour of said pipeline throughout the depth of said pipeline extension beneath said surface of said liquid.

20. The pipeline spatial orientation control system as recited in claim 19 wherein said vehicle guidance means is moveably fastened to a pair of said submersible vehicles consecutively spaced along said pipeline.

21. The pipeline spatial orientation control system as recited in claim 20 wherein said vehicle guidance means is flexibly maintained in positional relation to said pipeline.

22. The pipeline spatial orientation control system as recited in claim 21 wherein said submersible vehicle translates with respect to said vehicle guidance means.

23. The pipeline spatial orientation control system as recited in claim 22 wherein said vehicle guidance means includes a flexible elongated member passing between a pair of consecutively spaced submersible vehicles and secured thereto.

24. The pipeline spatial orientation control system as recited in claim 23 wherein said flexible elongated member passes through a pair of displacement sensors mounted on each of said consecutively spaced submersible vehicles, said sensors for measuring the angular displacement of said vehicles with respect to each other.

25. The pipeline spatial orientation control system as recited in claim 24 wherein each of said submersible vehicles includes a spring loaded take up mechanism connected to said flexible member for maintaining a predetermined force on said member in the direction of said extension of said flexible member.

26. The pipeline spatial orientation control system as recited in claim 25 wherein each of said vehicles is positionally aligned with respect to said flexible member through a pulley rotatably fastened to said vehicle, said flexible member contacting said pulley in moveable relation thereto.

27. A method for controlling the spatial orientation of a pipeline beneath the surface of a liquid including the steps of:

a. determining a first pipeline contour of said pipeline beneath said surface of said liquid; and, b. changing said first pipeline contour to a second pipeline contour responsive to said determination of said pipeline contour, including the steps of;

1. attaching a plurality of submersible vehicles to said pipeline, said vehicles being adapted to provide thrust force to said pipeline,
2. movably fastening said plurality of said submersible vehicles to a vehicle guidance mechanism,
3. determining said first pipeline contour through the spatial orientation of said vehicle guidance means, and
4. thrusting said pipeline responsive to said spatial orientation of said vehicle guidance mechanism, said pipeline being moved to said second pipeline contour.

28. The method as recited in claim 27 wherein the step of thrusting said pipeline includes the step of driving said plurality of submersible vehicles in a predetermined direction thereby moving said pipeline responsive to said movement of said submersible vehicles.

29. The method as recited in claim 28 wherein the step of driving said plurality of submersible vehicles includes the step of rotating said vehicles in a plane coincident with and parallel to a longitudinal axis of said pipeline.

30. The method as recited in claim 29 wherein the step of driving said plurality of submersible vehicles includes the step of translating said vehicles in a gravity oriented vector direction.

31. The method as recited in claim 30 wherein the step of driving said plurality of submersible vehicles includes the step of moving said vehicles in a direction normal said longitudinal axis of said pipeline.

32. The method as recited in claim 28 including the step of translating said submersible vehicles with respect to said pipeline in a direction along said longitudinal axis of said pipeline.

33. The method as recited in claim 32 including the step of controlling the movement of said submersible vehicles responsive to electrical signals from a control drive mechanism remote to said submersible vehicles.

* * * * *